No. 687,226. Patented Nov. 26, 1901.
O. A. GORR.
ANIMAL TRAP.
(Application filed Aug. 21, 1901.)
(No Model.) 2 Sheets—Sheet 1.
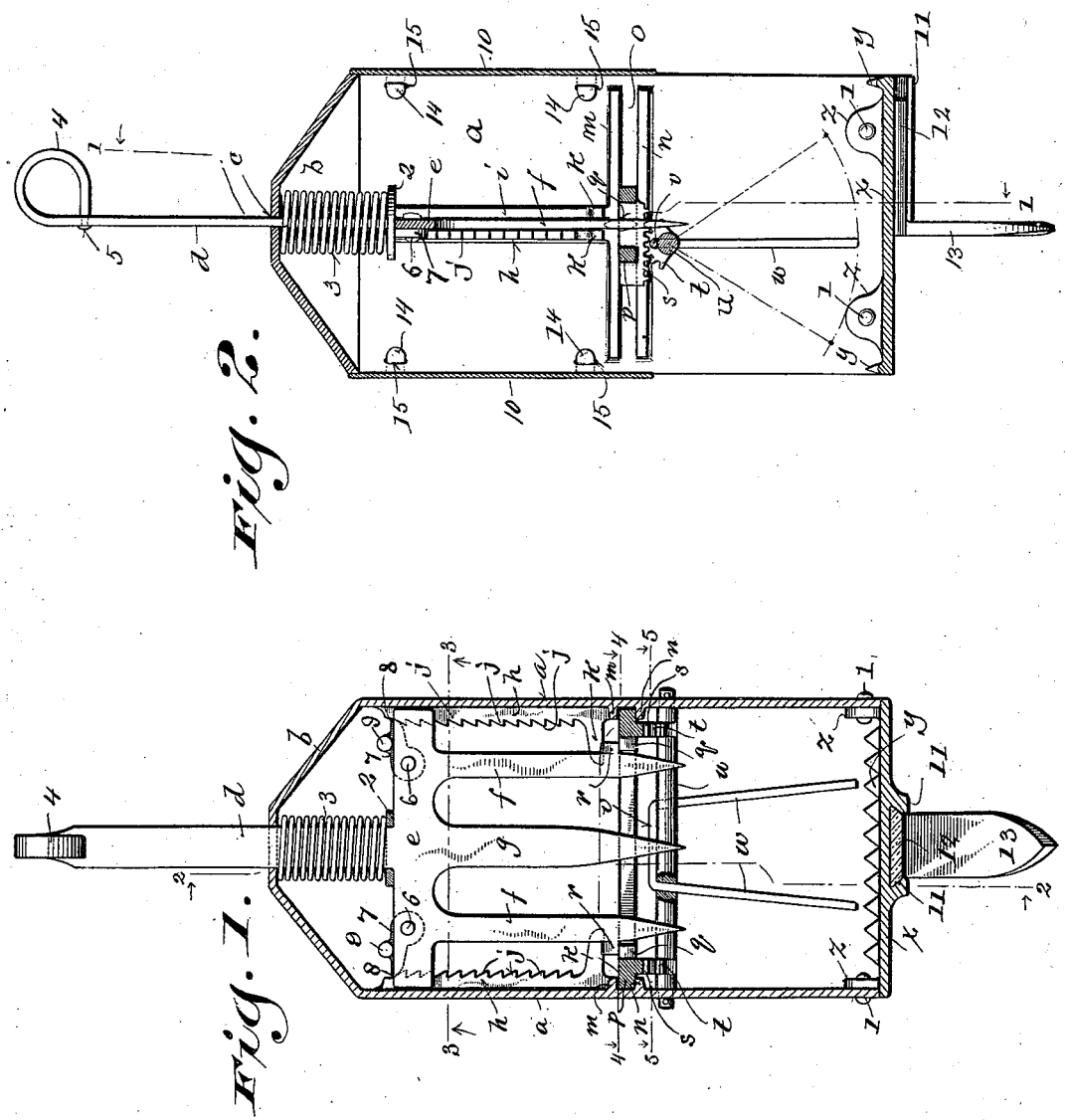

No. 687,226. Patented Nov. 26, 1901.
O. A. GORR.
ANIMAL TRAP.
(Application filed Aug. 21, 1901.)
(No Model.) 2 Sheets—Sheet 2.
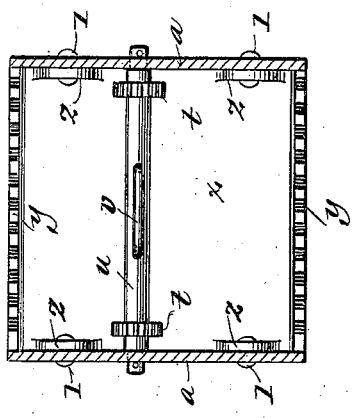
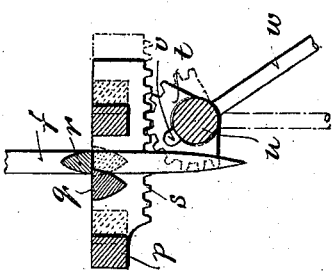
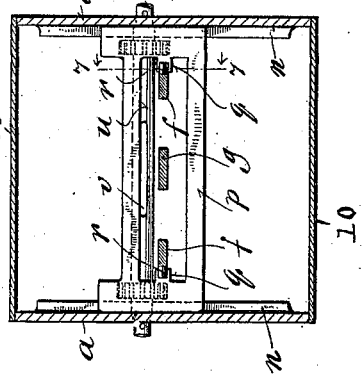
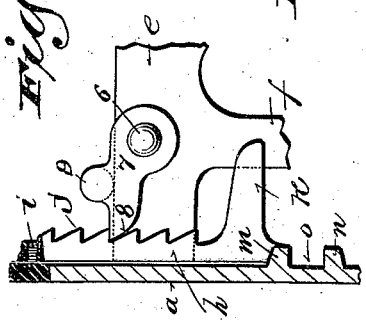
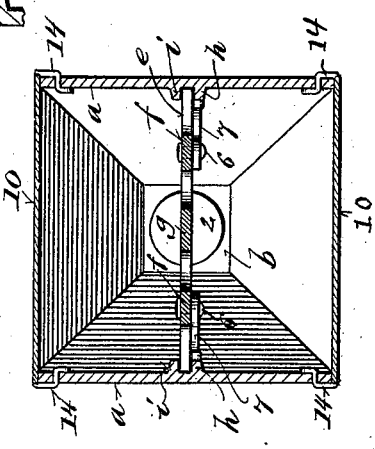
Witnesses:
Geo. W. Young.
B. C. Roloff.
Inventor:
Otto A. Gorr
By H. G. Underwood
Attorney
THE NORRIS PETERS CO., PHOTO-LITHO., WASHINGTON, D. C.

UNITED STATES PATENT OFFICE.

OTTO A. GORR, OF EAST FARMINGTON, WISCONSIN.

ANIMAL-TRAP.

SPECIFICATION forming part of Letters Patent No. 687,226, dated November 26, 1901.

Application filed August 21, 1901. Serial No. 72,736. (No model.)

*To all whom it may concern:*

Be it known that I, OTTO A. GORR, a citizen of the United States, and a resident of East Farmington, in the county of Polk and State of Wisconsin, have invented certain new and useful Improvements in Animal-Traps; and I do hereby declare that the following is a full, clear, and exact description thereof.

My invention relates to that class of animal-traps in which the body of the animal is caught and impaled by a sharp instrument released from its detent by the action of the animal in entering the trap; and it consists in certain peculiarities of construction and combination of parts, as will be fully set forth hereinafter in connection with the accompanying drawings, and subsequently claimed.

In the said drawings, Figure 1 is a vertical sectional view of a trap embodying my present invention, taken on the plane indicated by the line 1 1 in Fig. 2. Fig. 2 is a like vertical sectional view taken on the line 2 2 in Fig. 1. Figs. 3, 4, and 5 are horizontal sectional views taken respectively on the lines 3 3, 4 4, and 5 5 in Fig. 1. Figs. 6 and 7 are partly-sectional views, drawn to an enlarged scale, illustrating certain details of construction of the movable parts.

Referring to the drawings, $a\ a$ represent the side pieces of the trap, formed, preferably, of cast metal, and $b$ the top thereof, having a central slot $c$ therein for the passage therethrough of the shank $d$ of the impaling device, the latter being formed with a cross-head $e$ and a series of sharply-pointed downwardly-projecting prongs $f f g$, forming a fork which has vertically-sliding movement, the ends of the cross-head $e$ traveling in ways or grooves between the vertical guides $h\ i$, which project from and are preferably integral with the side pieces $a\ a$ of the trap. The guides $h$ are formed with ratchet-teeth $j\ j$ thereon, and both sets of guides $h\ i$ have laterally and inwardly projecting fingers $k\ k$ at their lower ends, between which the outer prongs $f f$ have movement. Just below the lower ends of the vertical guides $h\ i$ are located horizontal guide-strips $m\ n$, projecting inwardly from the said side pieces $a\ a$, forming between them the transverse ways or grooves $o$, within which the ends of the slide $p$ have movement. The slide is a skeleton oblong frame with two inward-projecting lugs $q\ q$, extending from the inner edges of the ends of said slide, these lugs $q q$ being flat on top and flush with the flat top of the slide and beveled to a point on their under surfaces. The outer prongs $f f$ of the impaling-fork are formed with corresponding lugs $r\ r$ on their outer edges arranged in a reverse position to the lugs $q q$—that is, the prong-lugs $r\ r$ are flat on their under surfaces and beveled or pointed on their upper surfaces. The slide $p$ is formed with transverse rack-bars or rows of teeth $s\ s$ on the under side of its ends for engagement with toothed segments $t\ t$ on a rock-shaft $u$, journaled in the side pieces $a\ a$ of the trap on a plane below that of the guide-strips $n\ n$ and at one side vertically of the line of the described impaling-fork. The said rock-shaft $u$ is grooved and perforated for the reception of a bent-wire trigger $v$, having depending arms $w\ w$, which are preferably bent outwardly on diverging lines, as best shown in Fig. 1. The two side pieces $a\ a$ of the trap are connected by a bottom plate $x$, formed with rows $y\ y$ of sharp teeth projecting upwardly from its front and rear edges, and with upward-projecting lugs $z\ z$, adjacent to its side edges, by means of which lugs and bolts or rivets the said bottom plate is united to the lower ends of the said side pieces $a\ a$. A washer 2 surrounds the shank $d$ of the impaling-fork and rests on the cross-head $e$ thereof, and a spiral spring 3 also surrounds said shank $d$ between this washer and the top $b$ of the trap. In practice the said shank and the cross-head $e$ and prongs $f f g$ of the fork are all made integrally, and after the parts are assembled the upper end of the said shank is bent around to form a loop or finger-hold 4, whose reduced end is thrust through a hole in the shank and then this end upset, as best shown at 5 in Fig. 2.

Secured by pivots 6 6 to the cross-head $e$ of the fork, adjacent to each end thereof, are dogs or pawls 7 7, whose free ends 8 8 engage with the teeth $j j$ of the guides $h h$, the downward movement of said dogs or pawls being limited by the laterally-projecting pegs 9 9, which normally rest on the upper edge of the said cross-head e. In order to better protect the described mechanism from the effects of dirt, rain, or snow when the trap is in an exposed position, front and rear pieces 10 10 are provided to extend from beneath the top b down to about the line of the lower transverse guide-strips n n, these pieces 10 being preferably of thin sheet metal, with projecting tongues 14 14, which are inserted through holes 15 15 in the side pieces a a and bent and clenched, as shown in Figs. 2 and 3. As it is often desirable to set this trap out of doors, the bottom plate x is formed with guide-strips 11 11 for the reception of the horizontal flange 12 of the pointed post 13, by means of which the device is secured in the desired location, as adjacent to a gopher or rat hole, by driving the post into the ground, the said post being withdrawn when the trap is to be set within a house or other building.

The operation of my invention will be readily understood from the foregoing description of its construction, taken in connection with the accompanying drawings. The trap is set with the impaling-fork elevated, as shown in Figs. 1 and 2, being kept in this position against the force of the compressed spring 3 by the engagement of the lugs r r on the fork-prongs f f with the lugs q q of the slide p, as best shown in Figs. 1 and 4. The trap is located close to the hole of the animal, and, if desired, any suitable bait may be placed back thereof, so as to be inaccessible save through the open lower part of the trap. The animal in order to reach the bait or to escape from its hole would attempt to pass through the trap between the arms w w of the trigger v and thereby turn said arms, thus rocking the rock-shaft u, whose toothed segments t t being in engagement with the teeth or rack-bars s s on the under side of the slide p will thereby move said slide and free its lugs q q from engagement with the fork-lugs r r, and then the spring 3, bearing on the cross-head e, will instantly force the said fork downward, driving its prongs f f g into the animal, the lower part of whose body will thus also be forced against the rows of sharp teeth y y on the bottom plate x of the trap, and as the fork descends the free ends 8 8 of its dogs or pawls 7 7 will successively slip over the inclined upper surfaces of the teeth j j of the guides h h, but always bear against the straight lower edge of said teeth, and thus the animal will be unable to raise the spring-pressed fork, and hence be prevented from getting free of the trap.

Having thus described my invention, what I claim as new, and desire to secure by Letters Patent, is—

1. In an animal-trap, the combination with the side pieces thereof having pairs of vertical guides on their opposed inner faces, forming ways or grooves between them, and one guide of each pair being formed with ratchet-teeth; of a spring-controlled impaling-fork, having a cross-head vertically movable in said ways or grooves, and downward-projecting sharp prongs; gravity-acting dogs or pawls pivotally secured to said cross-head, provided with laterally-projecting pegs normally resting on the upper edge of said cross-head to limit their downward movement and having their free ends in engagement with said guide-teeth; a detent for supporting said fork in a raised position; and a trigger in the path of the animal to be trapped for freeing the fork from said detent.

2. In an animal-trap, the combination with the side pieces thereof having pairs of vertical guides on their opposed inner faces, and pairs of horizontal guides below the said vertical guides, forming ways or grooves between each pair of vertical and horizontal guides; of a spring-controlled impaling-fork having a cross-head vertically movable in the vertical ways or grooves, and downward-projecting sharp prongs, the outer prongs being formed with outwardly-projecting detent-lugs; a slide movable in the horizontal ways or grooves, and having inward-projecting detent-lugs for engagement with the detent-lugs on the said fork-prongs, whereby the fork may be kept in a raised position, when the trap is set; and a trigger, located in the path of the animal to be trapped, and connected to said slide, whereby as said trigger is moved by the animal entering the trap, the said slide is thereby horizontally moved, so that its detent-lugs will be forced from under the detent-lugs on the fork-prongs, and the latter will be enabled to be forced downward by the fork-spring.

3. In an animal-trap, the combination with the side pieces thereof, having pairs of vertical guides on their opposed inner faces, and pairs of horizontal guides below the said vertical guides, forming ways or grooves between each pair of vertical and horizontal guides; of a spring-controlled impaling-fork having a cross-head vertically movable in the vertical ways or grooves, and downward-projecting sharp prongs, the outer prongs being formed with outwardly-projecting detent-lugs; a slide movable in the horizontal ways or grooves, and having inward-projecting detent-lugs, for engagement with the detent-lugs on the fork-prongs, and transverse rack-bars on the under side of its ends; a rock-shaft, journaled in the side pieces on a plane below that of the horizontal guides and at one side of the vertical plane of the impaling-fork, and having toothed segments for engagement with the rack-bars on the said slide; and a trigger, secured to said rock-shaft, and having arms depending in the path of the animal to be trapped.

4. In an animal-trap, the combination with the bottom plate thereof, having guide-strips on its under side, of a removable pointed post formed with a right-angled upper horizontal flange for engagement with said guide-strips, the said pointed post projecting downward from the center of said bottom plate.

In testimony that I claim the foregoing I have hereunto set my hand, at Glenwood, in the county of Pope and State of Minnesota, in the presence of two witnesses.

OTTO A. GORR.

Witnesses:
 OLIVER ROMBOUGH,
 FRANK E. REED.